United States Patent [19]
Fuchek

[11] 4,334,576
[45] Jun. 15, 1982

[54] THERMOSTAT CONTROL

[76] Inventor: Linus C. Fuchek, 4019 93rd Ave., Southeast, Mercer Island, Wash. 98040

[21] Appl. No.: 276,962

[22] Filed: Jun. 24, 1981

[51] Int. Cl.³ .............................................. F25B 29/00
[52] U.S. Cl. ........................................ 165/12; 165/29; 236/46 R; 337/305
[58] Field of Search ................ 165/12, 29; 236/46 R; 337/301, 302, 303, 304, 305

[56] References Cited

U.S. PATENT DOCUMENTS

| 2,558,617 | 6/1951 | Kronmiller | 62/378 X |
| 4,180,789 | 12/1979 | Martvcci | 337/301 |
| 4,186,874 | 2/1980 | Jensen | 236/46 R |
| 4,223,291 | 9/1980 | Teichert | 337/303 |
| 4,265,298 | 5/1981 | Sumner et al. | 165/12 X |
| 4,266,599 | 5/1981 | Squnders et al. | 165/12 X |
| 4,277,018 | 7/1981 | Nelson | 236/46 R |
| 4,293,029 | 10/1981 | Godard et al. | 165/29 |
| 4,298,056 | 11/1981 | Nelson | 165/12 |

Primary Examiner—Albert W. Davis
Assistant Examiner—Margaret A. Focarino
Attorney, Agent, or Firm—Seed, Berry, Vernon & Baynham

[57] ABSTRACT

A thermostat control for a heat pump thermostat allows the heat pump to change its temperature setting automatically and systematically minimizing the use of resistive heating with the heat pump as a backup to accomplish the temperature change. A cam having a smooth and gradually varying cam surface changes the position of the thermostat control on the heat pump thermostat to move the control through a desired temperature differential at a rate less than the rate at which resistive heating will be used as a backup to aid the change unless the heat pump is operating at full capacity.

13 Claims, 4 Drawing Figures

THERMOSTAT CONTROL

DESCRIPTION

1. Technical Field

This invention relates to a thermostat control for a heat pump thermostat which allows the heat pump to change its temperature setting automatically and systematically using a minimum of resistive heating as a backup to accomplish the temperature change.

2. Background Art

As outlined in U.S. Pat. No. 4,186,874, a great savings in heating costs would be possible if a reliable system to allow the gradual setback and return of the control temperature of a heat pump could be developed. While heat pumps are efficient at maintaining a temperature in a home, they are not as well designed to make changes in the temperature. Whenever a heat pump thermostat calls for a greater than 2° F. (1.1° C.) rise in the temperature, the heat pump automatically brings on a backup heater to aid in changing the room temperature, resulting in higher operating costs. Therefore, manufacturers of heat pumps normally advise users not to use a night setback system.

To overcome this problem with the use of heat pumps, U.S. Pat. No. 4,186,874 discloses a thermostatic control which allows nighttime setback of the thermostat temperature. Responsive to outside temperature, the control automatically triggers warming of the home at a rate which does not use backup heaters. Relatively sophisticated sensors are necessary and are placed so that the thermostatic control is able to sense both the inside temperature and the outside temperature. The thermostatic control of U.S. Pat. No. 4,186,874 fails to recognize a simple approach to obtaining accurate setback and return of the temperature without the use of resistive heaters.

DISCLOSURE OF INVENTION

A simple mechanical thermostat control which isp easily retrofit to control the thermostat of a heat pump thermostat in a house allows the heat pump to change its temperature setting automatically and systematically to minimize the use of resistive heating with the heat pump to accomplish the desired temperature change. Preferably, a clock motor drives a cam to turn suitable means associated with the cam so that the thermostat of the heat pump is moved through a desired temperature differential at a rate less than that rate at which resistive heating is needed. The cam keeps the temperature differential between the called-for temperature and the actual room temperature at less than about 2° F. (1.1° C.) so that the thermostat never calls for backup resistive heating except when operating at full capacity. Over a gradual period, such as three hours, the thermostat control allows for the economical and efficient raising or lowering of the temperature of a home.

Preferably, the means associated with the cam to move the heat pump thermostat through the desired temperature differential comprises a cam follower, a slide responsive to motion of the cam follower, a track in which the slide moves, and contact means on the slide to move the thermostat of the heat pump as the slide moves. The contact means ordinarily is an override fork which has a threaded bore section that rides upon a threaded trunnion. The trunnion is mounted on the slide and allows for a variation in the limits of the temperature differential. That is, ordinarily, the thermostat control of this invention may be set to vary the room temperature between about 60° F. (15.6° C.) and 70° F. (21° C.). However, by adjusting the position of the fork with the trunnion, the temperature differential may be adjusted to perhaps 62° F. (17° C.) to 72° F. (22° C.), or some other 10° F. (5.5° C.) range.

By mounting all the parts on a common plate, the thermostat control of this invention is easily retrofit to an existing heat pump thermostat by removing the thermostat casing from the wall and sliding the mounting plate into position against the wall. A handyman of average ability can easily install a thermostat control in his home to provide substantial energy savings. For example, in the Seattle area, between about 12%–23% energy savings may be obtained with the control.

BEST MODE FOR CARRYING OUT THE INVENTION

Figure 1:
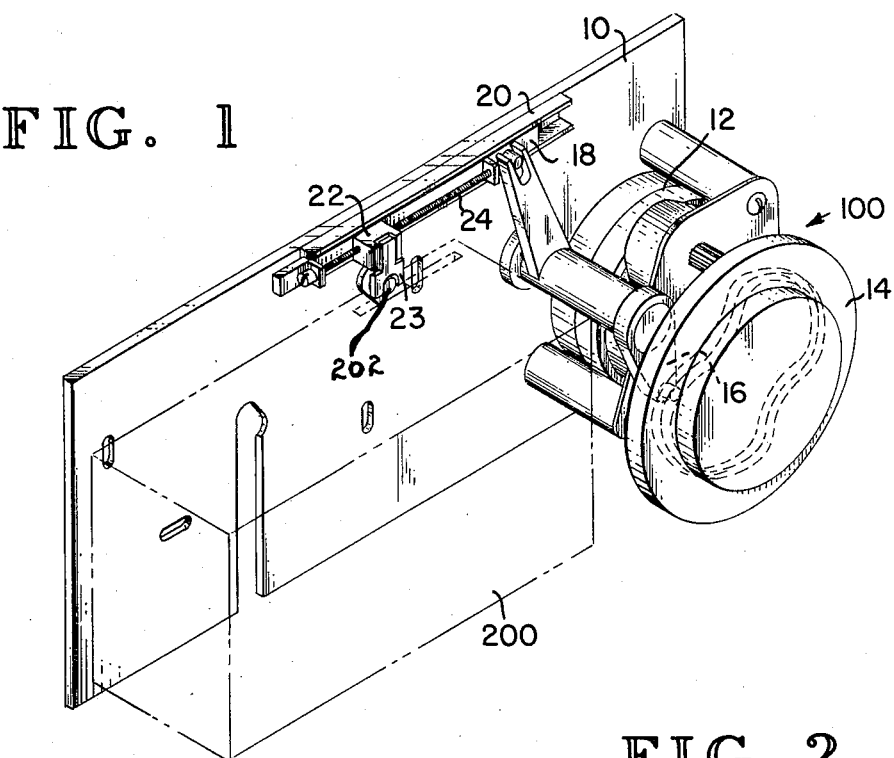
FIG. 1 is an isometric of a preferred thermostat control of this invention.

The thermostat control 100 for a thermostat of a heat pump or other home heating element is best shown in FIG. 1. Connected by a mounting plate 10 behind the heat pump thermostat 200, the thermostat control 100 of this invention allows the heat pump to change its temperature setting automatically and systematically to minimize the use of resistive heating with the heat pump to accomplish the temperature change. The thermostat control 100 has a clock motor 12, such as a 24-hour electric clock of the type described in U.S. Pat. No. 2,908,965. This clock motor is connected through suitable drive means to a cam 14 which is grooved to provide a surface for a cam follower 16. As the cam revolves responsive to the clock motor 12, the cam follower moves to adjust the thermostat position at a rate less than the rate at which resistive heating will be used as a backup to aid the desired temperature change. For most heat pumps, the cam 14 must be grooved so that the rate at which the thermostat moves is maintained at less than about a 2° F. (1.1° C.) temperature difference between the actual room temperature and the thermostat temperature setting. A grooved cam 14, which alters the temperature over a 10° F. (5.5° C.) temperature differential in about three hours, is highly satisfactory and results in a fuel savings of between 12%–23%. A cam 14 of this type adjusts the temperature and moves the thermostat at a rate of about 0.06° F./min (0.003° C./min). Commercially available heat pumps probably will be able to operate at a rate of about 0.1° F./min (0.055° C./min), although the 0.06° F./min rate is preferred. The three-hour period for making the ten-degree temperature change allows one to have his or her home gradually heated in the early morning hours during off-hours for electrical demand. Similarly, a gradual temperature reduction occurs in the evening. Unlike the control of U.S. Pat. No. 4,186,874, the control of this invention need not include sophisticated temperature sensors. Instead, the thermostat control 100 of this invention utilizes a purely mechanical system to raise and lower the temperature at prescribed rates within prescribed limits. The temperature changes will occur without regard to the outside temperatures. Resistive heating is used to accomplish the change only if the heat pump is already operating at full capacity. If the heat pump is large enough, use of resistive heating may be avoided, but this large a heat pump is ordinary impractical.

Figure 2:
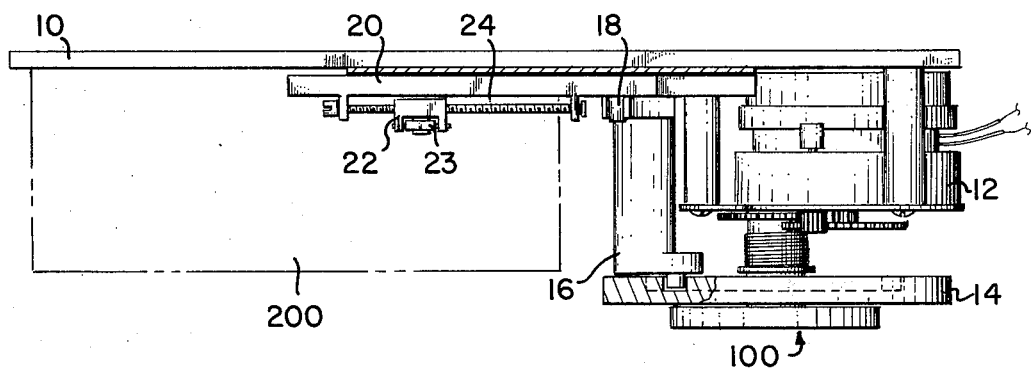
FIG. 2 is a top plan view of the thermostat control of FIG. 1.

The cam follower 16 is connected to a slide 18 which is responsive to the motion of the cam follower 16. The slide 18 moves in a track (which is shown in partial section in FIG. 2) and includes contact means 23 which are capable of engaging and moving the thermostat control 202 of the heat pump thermostat 200. Preferably, the contact means is an override fork which is capable of shuttling on a trunnion affixed to the slide 18. The shuttling of the override fork allows for variation in the limits of the temperature. That is, by shuttling the forks, the maximum and minimum temperature can be adjusted although the 10° F. (5.5° C.) temperature differential to be setback remains constant. The forks should be capable of straddling the thermostat control 202 of the heat pump thermostat 200 and be capable of moving the thermostat control 202 in response to the revolution of the cam 14. Furthermore, the contact means 22 are preferably disengageable from the thermostat control 202 so that the thermostat need not be controlled, although the clock motor 12 and cam 14 revolve. A simple way to disengage the thermostat control 100 from the heat pump thermostat 200 is to have the override fork pivotable on the trunnion 24. Merely flipping the fork upwardly disengages it from the thermostat control 202.

Figure 3:
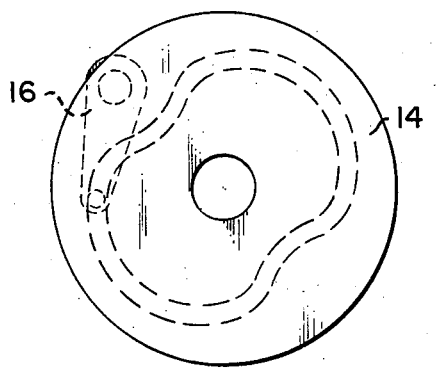
FIG. 3 is a detailed side elevation of the preferred cam of this invention.
Figure 4:
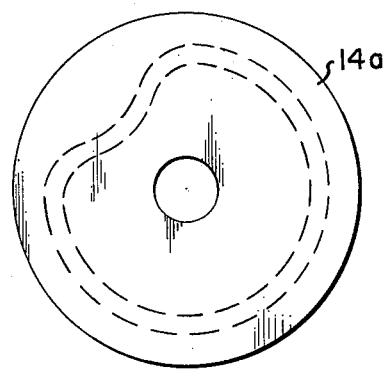
FIG. 4 is a detailed side elevation of an alternative cam of this invention.

FIGS. 3 and 4 show detailed side elevations of two preferred cams 14 and 14a. One cam 14 raises and lowers the temperature, both during the day and during the night, while the cam 14a lowers the temperature of the room only during the night. Both cams are similar in the sense that the adjustments in temperature are performed gradually and smoothly. Furthermore, the adjustments in temperature are performed automatically and systematically as either cam revolves on the clock motor 12. For use with a heat pump, it is important that the cam surface provide for a gradual change at a rate which will not induce the backup resistance heaters of the heat pump to be utilized. Therefore, step function (striking temperature change) cams, illustrated in U.S. Pat. Nos. 2,528,766; 3,680,020; 3,929,284; 3,949,936; 4,002,292; 4,102,495; and 4,156,502, are antithetical to the thermostat control 100 of this invention. While the step function cams may be useful in altering the temperature of a home which is heated by means other than a heat pump, they would not ensure that any energy savings would be achieved when used with a heat pump. In fact, as pointed out in U.S. Pat. No. 4,186,874, the step function cams of the listed United States Patents may, in fact, lead to an increased use of fuel and increased energy costs rather than a saving. At least there probably will be no savings of energy with step function cams.

Although the thermostat control 100 of this invention is best suited to adjust gradually the temperature setting of a heat pump, the thermostat control 100 may be used with other home heating elements. When used with other home heating elements, however, there may be less need to ensure the gradual temperature change obtainable with the particular cams of this invention. In any event, the trunnion and override fork disengaging means may be desirable features for the thermostat control.

Those skilled in the art will recognize modifications of this invention. If these modifications fall within the inventive concept described and shown, they are considered to be a part of this invention. Therefore, this invention should not be limited to the features described and shown, but should be given as broad an interpretation as is fairly available in view of the claims and the prior art.

I claim:

1. A thermostat control for a heat pump thermostat which allows the heat pump to change its temperature setting automatically and systematically minimizing the use of resistive heating with the heat pump as a backup to accomplish the temperature change, the heat pump thermostat control comprising:
   (a) a clock motor;
   (b) a cam operatively associated with the motor to turn with time as the motor turns;
   (c) means associated with the cam to move the heat pump thermostat through a desired temperature differential at a rate less than that rate at which resistive heating will be used as a backup to aid the change unless the heat pump is operating at full capacity.

2. The control of claim 1 wherein the means moves the thermostat through a temperature differential of about 10° F. (5.5° C.).

3. The control of claim 1 wherein the means moves the thermostat at a rate to maintain less than about a 2° F. (1.1° C.) temperature difference between the room temperature and the thermostat temperature setting.

4. The control of claim 1 wherein the means moves the thermostat at a rate of about 0.1° F./min (0.055° C./min).

5. The control of claim 1 wherein the means moves the thermostat at a rate of about 0.06° F./min (0.033° C./min).

6. The control of claim 1 wherein the means to move the thermostat includes a trunnion and an override fork which is capable of shuttling on the trunnion to vary the limits of the temperature control and which is capable of straddling the temperature control of the thermostat to move the control in response to the cam.

7. The control of claim 6 wherein the fork is pivotable so that the control of the thermostat may be disengaged from responsiveness to the cam.

8. The control of claim 1 wherein the means to move the thermostat includes means to decouple the cam from the thermostat.

9. The control of claim 1 wherein the means to move the control of the thermostat comprises:
   (a) a cam follower;
   (b) a slide responsive to motion of the cam follower;
   (c) a track on which the slide moves; and
   (d) contact means on the slide to move the control of the thermostat as the slide moves.

10. The control of claim 9 wherein the contact means includes a trunnion and an override fork which is capable of shuttling on the trunnion to vary the limits of the temperature control and which is capable of straddling the control of the thermostat to move the control of the thermostat as the slide moves.

11. The control of claim 1 wherein the motor, cam, and means to move the thermostat are all mounted on a plate to allow easy retrofit of the control with an already installed heat pump thermostat.

12. A thermostat control for a heat pump thermostat which allows the heat pump to change its temperature setting automatically and systematically minimizing the use of resistive heating with the heat pump as a backup to accomplish the temperature change, the heat pump thermostat control comprising:

(a) a clock motor;
(b) a cam operatively associated with the motor to turn with time as the motor turns;
(c) a cam follower
(d) a slide responsive to motion of the cam follower;
(e) a track in which the slide moves;
(f) contact means on the slide to move the thermostat control as the slide moves; and
(g) means to disengage the control of the thermostat from the cam operatively associated with the slide, wherein the heat pump thermostat is moved through a desired temperature differential at a rate less than that rate at which resistive heating will be used as a backup to aid the temperature change unless the heat pump is operating at full capacity.

13. The control of claim 12, further comprising a plate to hold the other elements and to allow easy retrofit of the control with an already installed heat pump thermostat.

* * * * *